United States Patent
Shin et al.

(10) Patent No.: US 7,519,873 B2
(45) Date of Patent: *Apr. 14, 2009

(54) METHODS AND APPARATUS FOR INTERFACING BETWEEN TEST SYSTEM AND MEMORY

(75) Inventors: Seung-Man Shin, Suwon-si (KR);
Seung-Jin Seo, Suwon-si (KR);
You-Keun Han, Yongin-si (KR);
Hui-Chong Shin, Seongnam-si (KR);
Jong-Geon Lee, Seoul (KR);
Kyung-Hee Han, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/517,259

(22) Filed: Sep. 8, 2006

(65) Prior Publication Data

US 2007/0022335 A1 Jan. 25, 2007

Related U.S. Application Data

(63) Continuation-in-part of application No. 11/142,673, filed on Jun. 2, 2005.

(30) Foreign Application Priority Data

Jun. 11, 2004 (KR) ............... 2004-0043015
May 25, 2005 (KR) ............... 2005-0043939

(51) Int. Cl.
*G01R 31/28* (2006.01)
(52) U.S. Cl. ............... 714/703; 702/120; 702/108; 714/718
(58) Field of Classification Search ............... 714/703
See application file for complete search history.

(56) References Cited

U.S. PATENT DOCUMENTS

| 6,233,182 | B1 | | 5/2001 | Satou et al. | |
|---|---|---|---|---|---|
| 6,249,893 | B1 | * | 6/2001 | Rajsuman et al. | 714/741 |
| 6,493,839 | B1 | * | 12/2002 | Miner | 714/718 |
| 6,606,670 | B1 | * | 8/2003 | Stoneking et al. | 710/14 |
| 6,622,197 | B1 | * | 9/2003 | Kim | 711/100 |
| 7,093,173 | B2 | * | 8/2006 | Roohparvar | 714/718 |
| 2003/0037295 | A1 | * | 2/2003 | Galzur et al. | 714/719 |

(Continued)

FOREIGN PATENT DOCUMENTS

KR 1999-003104 1/1999

OTHER PUBLICATIONS

International Search Report (PCT/ISA/210) and (PCT/ISA/220).

*Primary Examiner*—Jacques H Louis-Jacques
*Assistant Examiner*—Steven D Radosevich
(74) *Attorney, Agent, or Firm*—Harness, Dickey & Pierce, P.L.C.

(57) ABSTRACT

Methods and apparatuses for entering at least one memory into a test mode are provided. At least one test MRS bit may be stored in a first register for controlling the memory. At least one test MRS code may be programmed into a second register. Each of the at least one bits stored in the first register may correspond one of the at least one test MRS codes stored in the second register.

25 Claims, 8 Drawing Sheets

U.S. PATENT DOCUMENTS

| | | |
|---|---|---|
| 2003/0065997 A1 | 4/2003 | Yamazaki et al. |
| 2003/0110301 A1* | 6/2003 | Han .......................... 709/249 |
| 2003/0167431 A1* | 9/2003 | Nicolaidis et al. .......... 714/733 |
| 2003/0202409 A1 | 10/2003 | Yamaoka et al. |
| 2004/0082121 A1 | 4/2004 | Perner |
| 2004/0255109 A1* | 12/2004 | Nakajima ...................... 713/1 |
| 2005/0002240 A1* | 1/2005 | Hamaguchi et al. .... 365/185.33 |
| 2005/0125583 A1* | 6/2005 | Shih .......................... 710/260 |
| 2005/0138267 A1* | 6/2005 | Bains et al. ................. 711/100 |
| 2005/0149636 A1* | 7/2005 | Lake et al. ..................... 710/3 |
| 2005/0289287 A1* | 12/2005 | Shin et al. ...................... 711/1 |
| 2007/0022335 A1* | 1/2007 | Shin et al. ................... 714/718 |

\* cited by examiner

METHODS AND APPARATUS FOR INTERFACING BETWEEN TEST SYSTEM AND MEMORY

PRIORITY STATEMENT

This application is a continuation-in-part application of U.S. application Ser. No. 11/142,673, filed on Jun. 2, 2005, which claims priority under 35 U.S.C. §119 to Korean Patent Application No. 2004-0043015 filed on Jun. 11, 2004 and Korean Patent Application No. 2005-0043939 filed on May 25, 2005 in the Korean intellectual property Office (KIPO), the entire contents of all of which are incorporated herein by reference.

BACKGROUND OF THE INVENTION

1. Technical Field

Example embodiments of the present invention relate to a methods and apparatuses for interfacing with a memory (e.g., an embedded memory) to enable a memory test mode.

2. Description of Conventional Art

As density of semiconductor integrated circuits (ICs) increases, tests for semiconductor ICs have become increasingly complex and/or difficult. For example, as capacity of semiconductor memory devices increases to Gigabit (GB) levels, overhead associated with memory test time and/or memory testing costs may increase.

A system-on-chip (SOC), memory merged logic (MML), digital signal processor (DSP) and/or a central processing unit (CPU) may include an embedded memory and/or a memory module (e.g., a fully buffered dual inline memory module (FB-DIMM)). A memory module may include a hub and/or an embedded memory. Conventionally, embedded memory may be more difficult to test, because of a lack of direct access to the memory from outside of the chip and/or memory module.

A conventional memory module may be mounted on a slot of a board (e.g., a main board, a motherboard, etc.) in a computer. This memory module may be tested to help ensure proper functionality of the memory. However, accessing the memory in the system board test environment may be difficult from, for example, outside the memory module.

Within the memory test environment, a test apparatus and/or an embedded self-test technique, interfacing between the memory and a logic circuit, may-be needed. As operating speeds and/or amount of data to be processed increases, performance of main memory may become increasingly important in upgrading system performance.

A main memory may establish addresses and/or data for controlling a chip set, central processing unit (CPU), peripheral devices, etc. A fault of the main memory (e.g., including a memory, such as, a synchronous dynamic random access memory (SDRAM) module, or any other suitable memory and/or memory module) may affect system performance. An SDRAM may include a mode setting register (MSR) and may operate in a mode programmed using a value of the MSR. The MSR of the SDRAM may be programmed, for example, by storing a mode register set (MRS) command with address data in the MSR.

FIG. 1 is a table illustrating a conventional normal mode MRS code of SDRAM. Referring to FIG. 1, an operating mode of the memory may be determined based on data input to address input terminals of the memory A0 through A15 and BA0 through BA2. Data input to each of the address input terminals may be stored in a mode register of the memory chip. A burst type, a burst length, a latency, a test mode and/or an on-die termination dynamic link library (ODT-DLL) may be set using the mode register. A mode register set (MRS) may be applied to the memory during a system booting process and/or an initialization process of an automatic test equipment (ATE). All, or substantially all, systems may use a standardized MRS. A test MRS used for testing the memory, however, may not be standardized. Each memory manufacturer may provide a different test MRS. For example, each memory manufacturer may provide a unique test mode enter sequence for entering memory into the test mode. This may reduce the likelihood that memory inadvertently enters a test mode, when errors or faults occur in operations.

For example, a test mode enter sequence may be applied (e.g., continuously) to a memory for several cycles. When all, or substantially all, of the test mode enter sequences have been applied, the memory may enter a test mode. Each of the memory manufacturers may provide a test device, which may be capable of setting a unique test MRS.

SUMMARY OF THE INVENTION

One or more example embodiments of the present invention relate to methods and apparatuses for interfacing between a test system and memories. One or more example embodiments of the present invention may improve flexibility of a memory test environment, for example, by programming a test mode enter sequence into a register in a memory interface unit. This may allow various memories having a different test mode enter sequences to adaptively enter into the test mode and/or improve flexibility of a memory test environment. In addition, one or more example embodiments of the present invention provide methods and apparatuses, which may be more freely set a test mode entrance, for example, regardless of an operating condition of a system.

In a method according to an example embodiment of the present invention, test mode enter sequence data may be programmed into a memory test register. The test mode enter sequence data may correspond to a memory to be tested. Whether a test mode set command has been input may be checked and the test mode enter sequence data programmed in the memory test register may be accessed if a test mode set command has been input. The memory may be set into the test mode.

An apparatus, according to an example embodiment of the present invention, may include a memory and a controller. The memory may include a test register having test mode enter sequence data programmed therein. The test mode enter sequence data may correspond to a memory to be tested. The controller may be configured to check whether a test mode setting command has been input, access the test mode enter sequence data programmed into the memory test register, if the test mode setting command has been input, and set the memory to the test mode.

In a method, according to another example embodiment of the present invention, a setting bit may be read from test mode enter sequence setting register. Whether the read setting bit is a valid bit may be determined, and a corresponding enter sequence data may be accessed from the test mode enter sequence data register, if the read setting bit is determined to be a valid setting bit. A test mode setting signal may be provided to a memory chip in response to the accessed enter sequence data. The test mode enter sequence may be performed, for example, by repeating the reading, determining, accessing and providing for each valid setting bit until the read setting bit is determined to be an invalid bit.

An apparatus, according to another example embodiment of the present invention, may include a test mode enter sequence setting register, a test mode enter sequence data register and/or a controller. The test mode enter sequence setting register may store at least one setting bit. The test mode enter sequence data register may store at least one enter sequence data. The controller may be configured to read one setting bit from the test mode enter sequence setting register, determine whether the read setting bit is a valid bit, access a corresponding enter sequence data from the test mode enter sequence data register, if the read setting bit is a valid setting bit, provide a test mode setting signal to the memory chip in response to the accessed enter sequence data and perform the enter sequence by repeating the reading, determining, accessing and providing for each valid setting bit until the read setting bit is determined to be an invalid bit.

A system, according to an example embodiment of the present invention, may include at least one memory chip and a controller. The at least one memory chip may be settable into a test mode. The controller may be configured to read one setting bit from a first register, determine if the read setting bit is a valid bit, access a corresponding enter sequence data from a second register, if the read setting bit is a valid bit, provide a test mode setting signal to the memory chip in response to the accessed enter sequence data and perform a test mode enter sequence by repeating the reading, determining, accessing and providing for each valid setting bit until the read setting bit is an invalid bit.

Example embodiments of the present invention may further include a plurality of memory chips, a test mode enter sequence setting register, a test mode enter sequence data register and/or an output circuit. The plurality of memory chips may be settable to a test mode. The test mode enter sequence setting register may store at least one setting bit. The test mode enter sequence data register storing at least one enter sequence data. The output circuit may be configured to output a test mode setting signal to at least one memory chip.

In example embodiments of the present invention, the test mode enter sequence data may include sequence enable data representing a number of the test mode enter sequences, and test mode enter command data corresponding to the number of test mode enter sequences. The sequence enable data may include a set of valid bits corresponding to the number of the test mode enter sequences. Each one of the valid bits may correspond to one of the test mode enter command data.

In example embodiments of the present invention, the setting of the embedded memory to the test mode may further include reading one bit among the sequence enable data, determining whether the read bit is a valid bit, accessing the test mode enter command data corresponding to the sequence enable data, if the read bit is a valid bit, providing a test mode setting signal to the memory in response to the accessed test mode enter command data and repeating the reading bit, determining, accessing, and providing until the accessed bit is an invalid bit.

In example embodiments of the present invention, the test mode enter command data my include test mode register set command data and address data. The memory test register may include a peripheral component interconnection (PCI) configuration register and/or a configuration register in an advanced memory buffer of a fully buffered dual inline memory module (FBDIMM).

In example embodiments of the present invention, the apparatus may be included in a system chip set, a memory buffer chip set of a memory module, the memory test register may include a peripheral component interconnection configuration register and/or a configuration register. The apparatus may be included in a system on chip (SOC), and/or the memory test register may include a configuration register.

In example embodiments of the present invention, the test mode enter sequence data may include sequence enable data corresponding to a number of the test mode enter sequences, and/or test mode enter command data corresponding to the number of the test mode enter sequences. Each of the consecutive valid bits corresponds to a respective one of the test mode enter command data.

In example embodiments of the present invention, the controller may read one bit among the sequence enable data, if the test mode setting command has been input, determine whether the read bit is a valid bit, access the test mode enter command data corresponding to the sequence enable data if the read bit is a valid bit, provide a test mode setting signal to the memory in response to the accessed test mode enter command data, and repeat the reading, determining, accessing, and providing until the accessed bit is an invalid bit.

In example embodiments of the present invention, the number of valid setting bits may correspond to the number of test mode enter sequences of the memory chip, and may be programmed into the test mode enter sequence setting register. The valid setting bits may be read from a least significant bit to a most significant bit of the test mode enter sequence setting register. The test mode enter sequence data may be programmed sequentially into the test mode enter sequence data register as a data sequence corresponding to the test mode enter sequence of the memory chip. The apparatus may be a hub mounted in a memory controller and/or a memory module.

BRIEF DESCRIPTION OF THE DRAWINGS

The present invention will become more apparent by describing in detail example embodiments of the present invention with reference to the accompanying drawings, in which.

DETAILED DESCRIPTION OF EXAMPLE EMBODIMENTS OF THE PRESENT INVENTION

Figure 1:
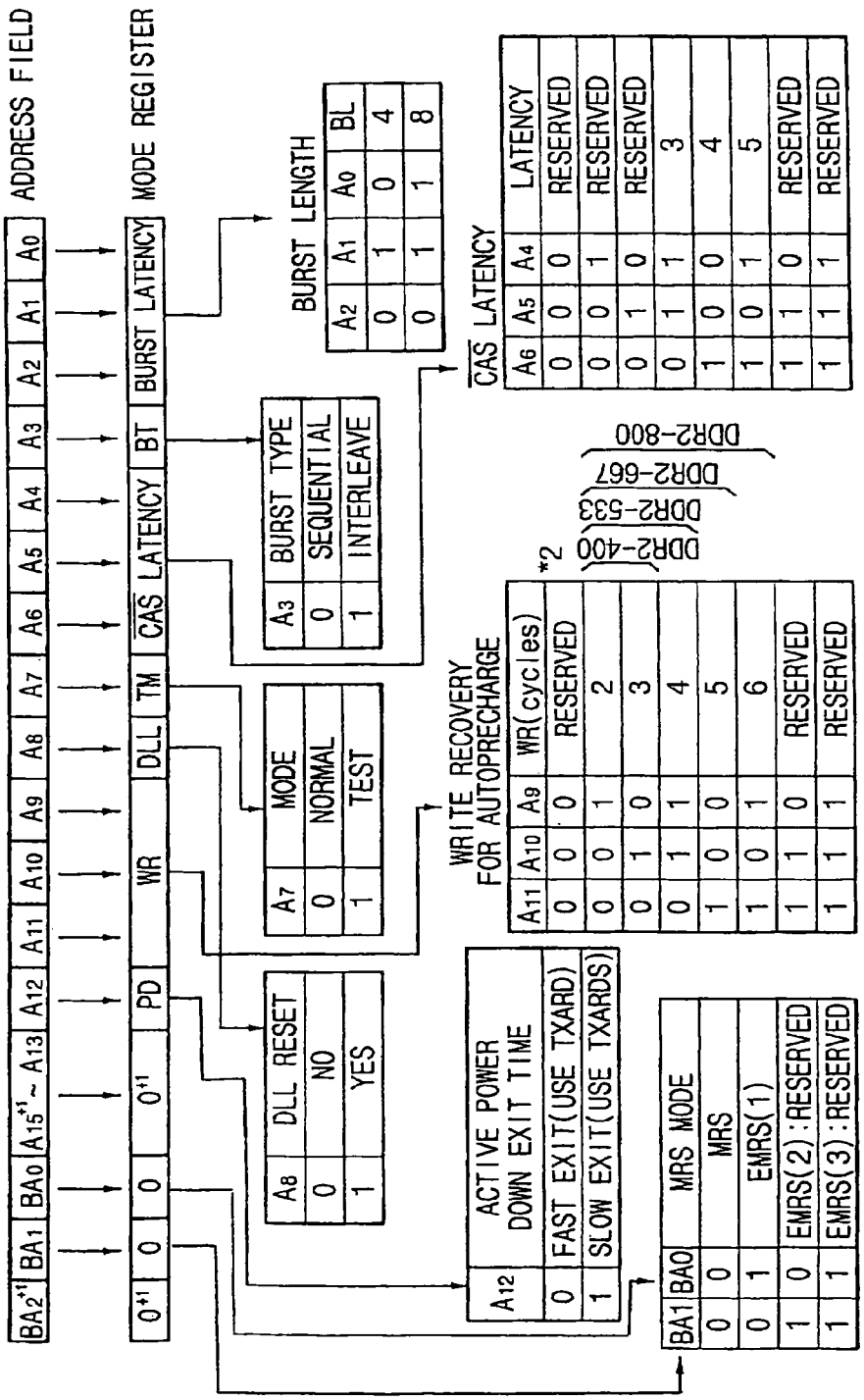
FIG. 1 is a table illustrating a conventional normal mode MRS code of SDRAM.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

At least some example embodiments of the present invention may be used in conjunction with a memory (e.g., an embedded memory) may be mounted in or on a SOC, a plurality of memories in a memory module, such as, FBDIMM, a memory mounted on a system board, a memory accessible through a logic circuit, and/or any other suitable memory. In one or more example embodiments of the present invention, memories may communicate with one or more external devices using packet data.

In one or more example embodiments of the present invention, a normal operation mode of the system may represent, for example, an operating state after an initial booting process of the system has been performed and an operating system is loaded. The test mode enter sequence data may include a sequence enable data. Sequence enable data may represent the number of the test mode enter sequence and test mode enter command data corresponding to the number of the test mode enter sequence. The sequence enable data may include a set of consecutive valid bits for counting the number of the test mode enter sequences. Each of the valid bits correspond to test mode enter command data.

When setting a memory into a test mode, one bit (e.g., a least significant bit (LSB)) among the sequence enable data may be read, and the read bit value may indicate whether the bit value is valid. A valid bit value may be any suitable logic value (e.g., a high logic value, logic value '1', etc.). An invalid bit value may be any other suitable logic value (e.g., a low logic value, logic value '0', etc.). These logic values may be interchangeable.

In response to a valid bit, corresponding test mode enter command data may be accessed. A test mode setting signal may be provided to the embedded memory in response to the accessed test mode enter command data.

Corresponding data may be repeated (e.g., continuously) for each valid bit until an invalid bit appears. When all of the test mode enter sequences are completed, the embedded memory may be set into a test mode. A readable/writable register may be used as the memory test register.

For example, a portion of a peripheral component interconnection (PCI) configuration register and/or a portion of a configuration register in advanced memory buffer (AMB) of the FB-DIMM may be used as a memory test register. A register in which the sequence enable data may be stored may be referred to as a test mode enter sequence set register (TMESSR). The register in which the test mode enter command data may be stored may be referred to as test mode enter sequence data register (TMESDR).

Apparatuses, according to one or more example embodiments of the present invention, may include a controller. The controller may be configured to check the memory test register having a corresponding test mode enter sequence data programmed therein, check and/or determine whether the test mode setting command may or may not be applied during the normal operation mode of the system, access the test mode enter sequence data programmed into the memory test register, for example, when the test mode setting command is applied and/or set the embedded memory to the test mode. The controller may be included in a memory and/or SOC chipset, a memory controller hub chip, a chipset of the system memory, an advanced memory buffer (AMB), any other memory and/or processor.

Figure 2:
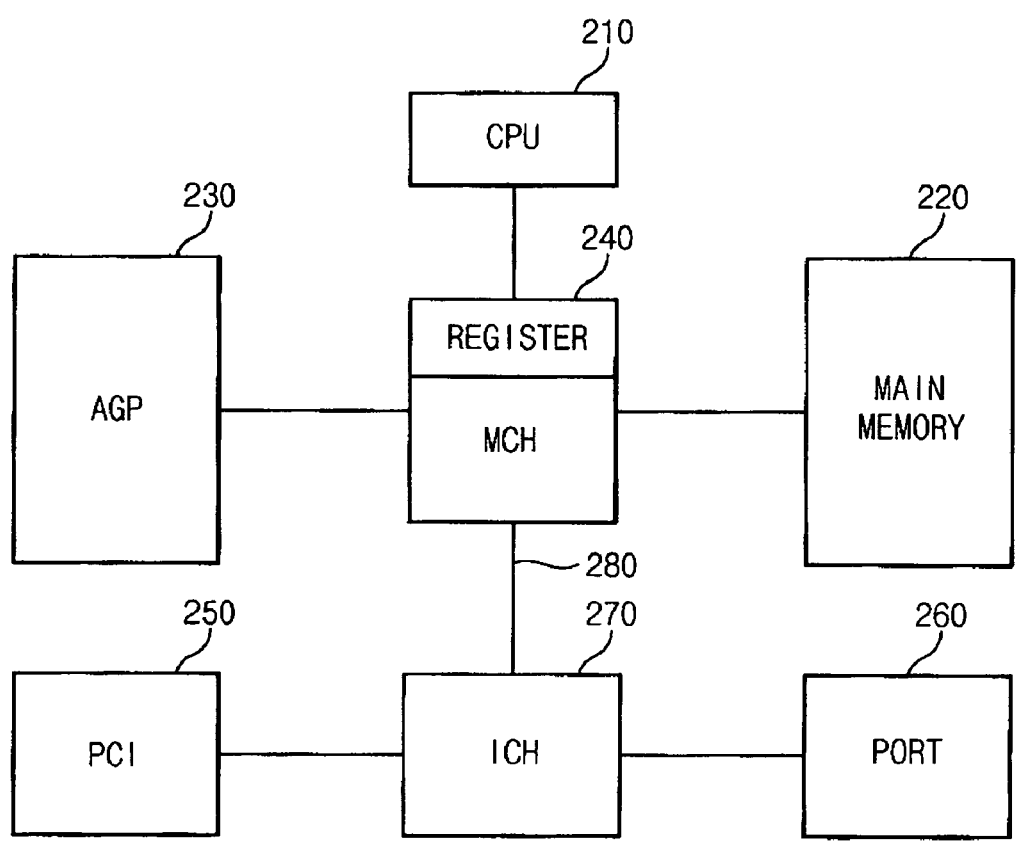
FIG. 2 is a block diagram illustrating a board on which a memory may be mounted according to an example embodiment of the present invention.

FIG. 2 is a block diagram illustrating a board (e.g., a system board, a main board, a motherboard, etc.), according to an example embodiment of the present invention. As shown, the board may include a CPU 210, a main memory 220, a memory control hub (or north bridge MCH) 240, a graphics card (AGP) 230, an input/output control hub (or south bridge ICH) 270, a port 260, a PCI slot 250 and/or a bus 280. The MCH 240 may control the AGP 230. The ICH 270 may control the PCI slot 250 and port 260. The bus 280 may interface between the MCH 240 and the ICH 270. The register of the MCH 240 may include a memory test register REGISTER.

Figure 3:
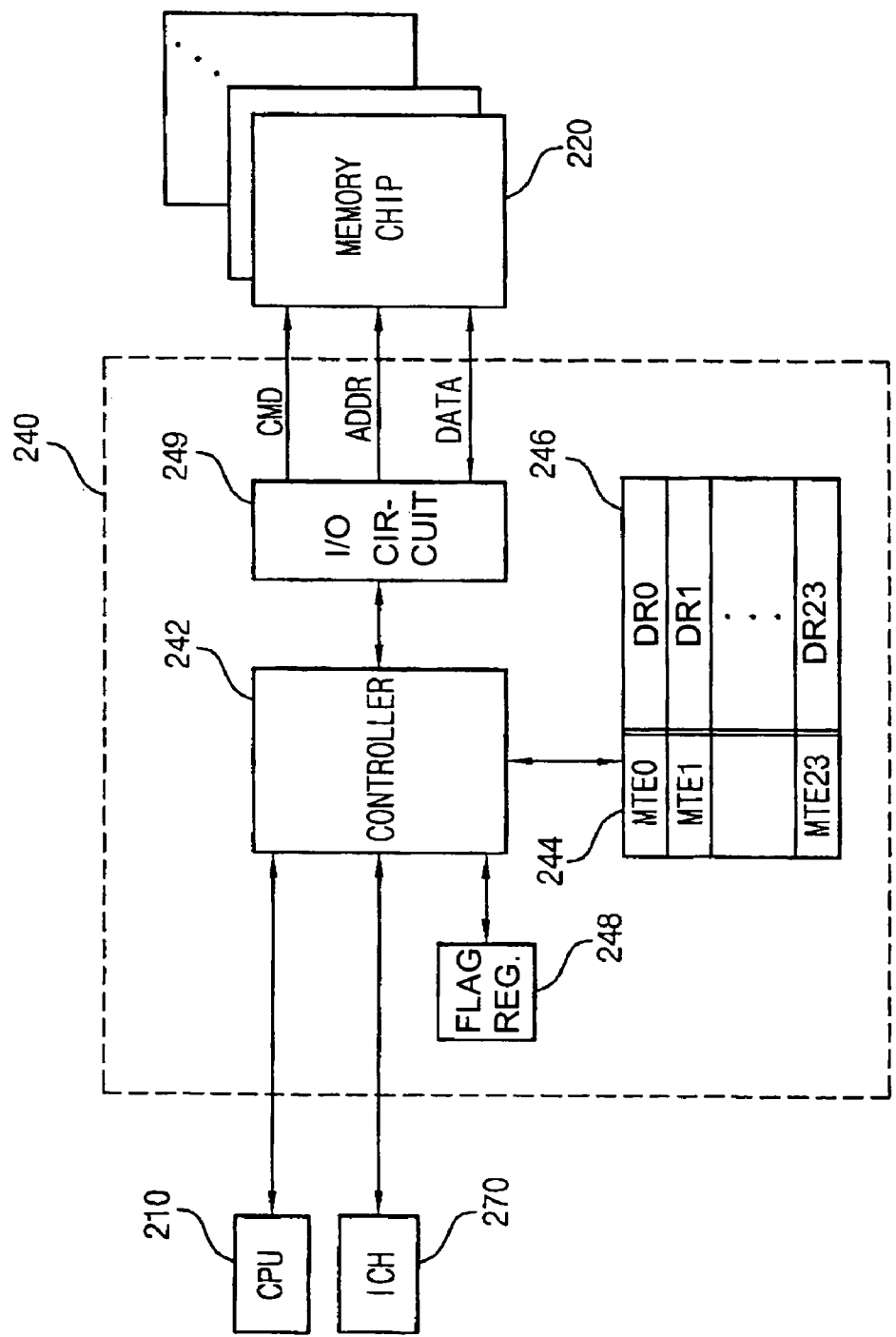
FIG. 3 is a block diagram illustrating a memory control hub according to an example embodiment of the present invention.

FIG. 3 is a block diagram illustrating the MCH 240 according to an example embodiment of the present invention. Referring to FIG. 3, the MCH 240 may include a controller 242, a first register 244, a second register 246, a flag register 248 and/or an I/O circuit 249.

Memory 220 (e.g., a synchronous memory, a synchronous memory module or any other suitable memory or memory module, etc.) may be coupled to the controller 242 of the memory control hub 240 through the I/O circuit 249. The controller 242 may provide command signals CMD, address signals ADDR and/or data signals DATA to a plurality of memories 220. Data read from the plurality of memory chips 220 may be sent to the controller 242, for example, as data signals DATA. The data signals DATA may include read and/or write data. The first register 244 may be a test mode enter sequence set register (TMESSR) in which test mode enter sequence set bits may be programmed. The second register 246 may be a test mode enter sequence data register (TMESDR) in which test mode enter sequence data may be programmed.

Figure 4:
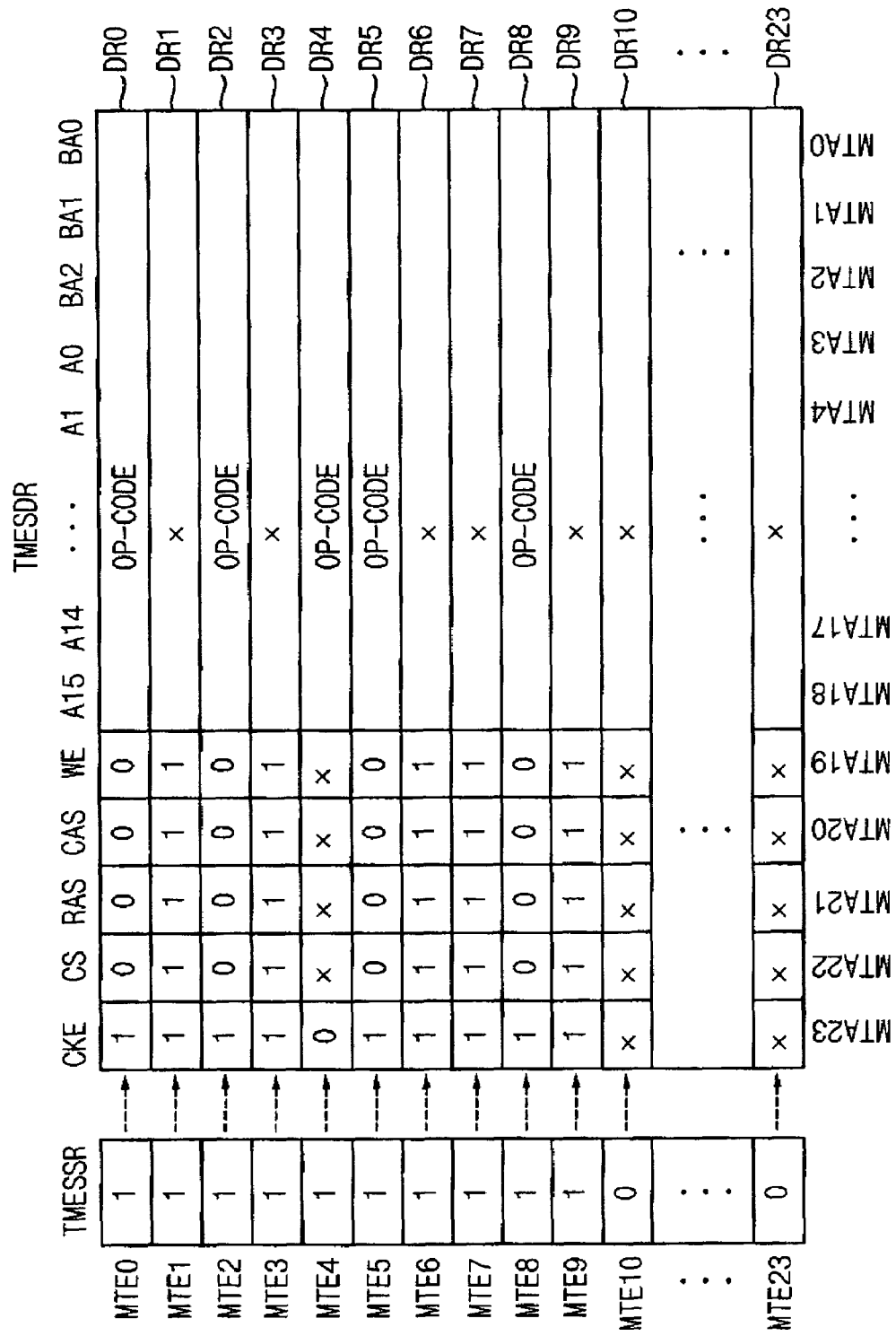
FIG. 4 is a table illustrating a memory test register according to an example embodiment of the present invention.

FIG. 4 is a table illustrating a TMESSR and a TMESDR according to an example embodiment of the present invention. A TMESSR may include, for example, 24-bits including set bits MTE0 through MTE23. Although example embodiments of the present invention will be described with regard to a 24-bit TMESSR, any suitable bit size register (e.g., 8, 16, 32, etc.) may be used. The TMESSR may store the number of test mode enter sequences. For example, if the test mode enter sequence includes 10 cycles, each set bit MTE0 through MTE9 may be set to logic value '1', and each set bit MTE10 through MTE23 may be set to a logic value '0'. As discussed above, in example embodiments of the present invention logic value '1' may represent a valid set bit, and the logic value '0' may represent an invalid set bit. However, any suitable logic value may be used, for example, interchangeably. In this example, the TMESSR may have a programmed set bit value of '00dFFh' (0000 0000 0000 0011 1111 1111).

The TMESDR may include, for example, 24 data registers DR0 through DR23. Each data register DR0 through DR23 may correspond to a respective one of the set bits MTE0 through MTE23. Although example embodiments of the present invention will be described with respect to a TMESDR having 24 data registers; it will be understood that any suitable number of registers may be used. For example, the number of data registers may correspond to the size of the TMESSR.

For example, the set bit MTE0 may correspond to the data register DR0, and the set bit MTE23 may correspond to the data register DR23. Test mode enter sequence data corresponding to the set bit MTEi having a logic value of '1' may be programmed in the data register DRi.

As shown in FIG. 4, valid data may be stored in each data register DR0 through DR9, with corresponding set bits MTE0 through MTE9 having the value of '1'. Each of the data registers DRi may include memory command information MTA23 through MTA19 such as clock enable (CKE), control strobe (CS), row address strobe (RAS), column address strobe (CAS), and/or write enable (WE), and memory address information MTA18 through MTA0.

In example embodiments of the present invention, each of the data registers DRi may be composed of 24-bits; however, the total bit composition is not limited to 24-bits (e.g., DQ or DQS may be added). Test operators may program the first register 244 and/or the second register 246 based on each of the test mode enter sequences made by a respective memory manufacturer.

Figure 5:
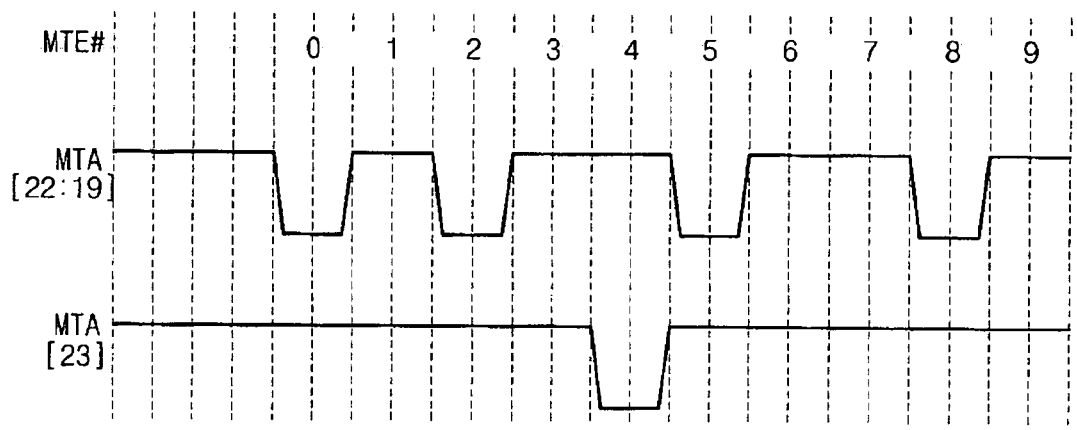
FIGS. 5 and 6 are example timing diagrams illustrating an operation of a programmed test mode enter sequence according to an example embodiment of the present invention.
Figure 6:
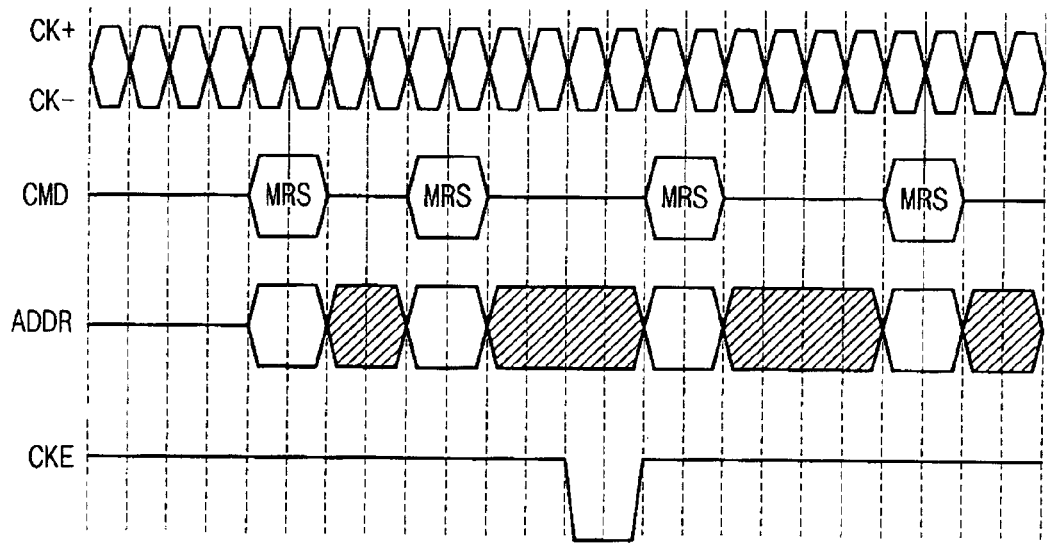

FIGS. 5 and 6 are example timing diagrams illustrating an example operation of a programmed test mode enter sequence according to an example embodiment of the present invention. As shown in FIG. 5, each of the data registers DR0, DR2, DR5 and DR8, corresponding to the set bits MTE0, MTE2, MTE5 and MTE8, may have a logic value '0'. The data register DR4, corresponding to the set bit MTE4, may also have a logic value '0'.

Referring to FIG. 6, a command sequence of, for example, MRS (mode register set), NOP (no operation), MRS, NOP, CKE (clock enable), MRS, NOP, NOP, MRS, -NOP, may be applied to the memory chip 220. The command sequence may be synchronized with clock signals CK+ and CK− and data stored in each of the data registers DR0 through DR9 may be read (e.g., sequentially).

In response to the four MRS commands, MRS address data may be provided to the memory chip 220 four times. In this example, a dummy (or pseudo) test MRS may be provided three times and a normal test MRS may be provided once. The memory chip 220 may enter into a test mode based on the fourth test MRS. The dummy tests may suppress (e.g., prevent) the likelihood that the memory chip 200 enters into the test mode due to an abnormal and/or faulty operation (e.g., an error, fault, or malfunction, etc.). Dummy tests may be different for each manufacturer.

The normal test MRS may be performed (e.g., continuously), for example, after two dummy test MRSs. In example embodiments of the present invention, the memory may be tested by programming the test mode enter sequences in the TMESSR and the TMESDR.

In example embodiments of the present invention, an operating system may be loaded during a system booting process. A flag register 248 may determine when the memory chip 220 enters into the test mode.

For example, when a value of the flag register 248 is '0', the memory chip 220 may enter into the test mode during the system booting process. When the value of the flag register 248 is '1', the memory chip 220 may enter into the test mode at any time period except the system booting process.

Figure 7:
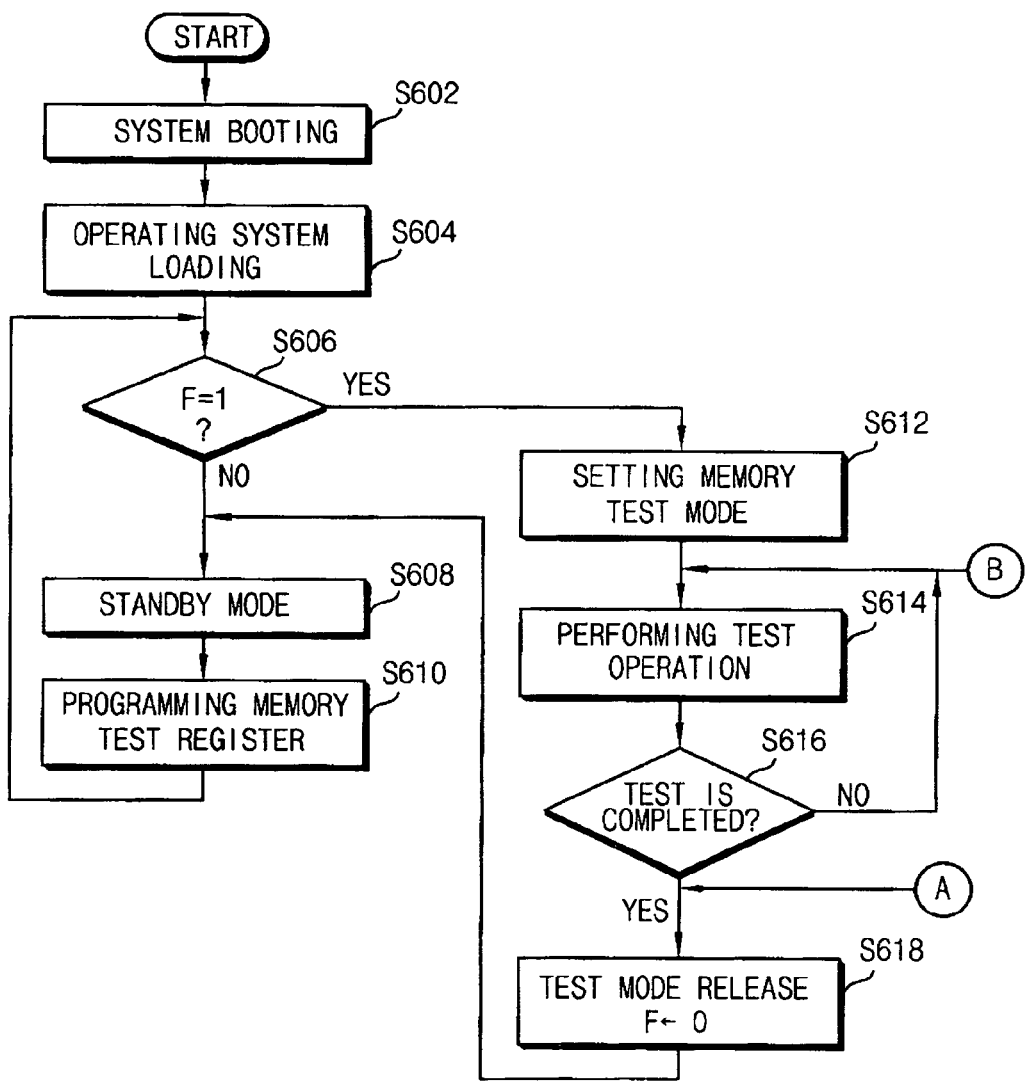
FIGS. 7 and 8 are example flow charts illustrating an operation of a test mode enter sequence of a memory according to an example embodiment of the present invention.
Figure 8:
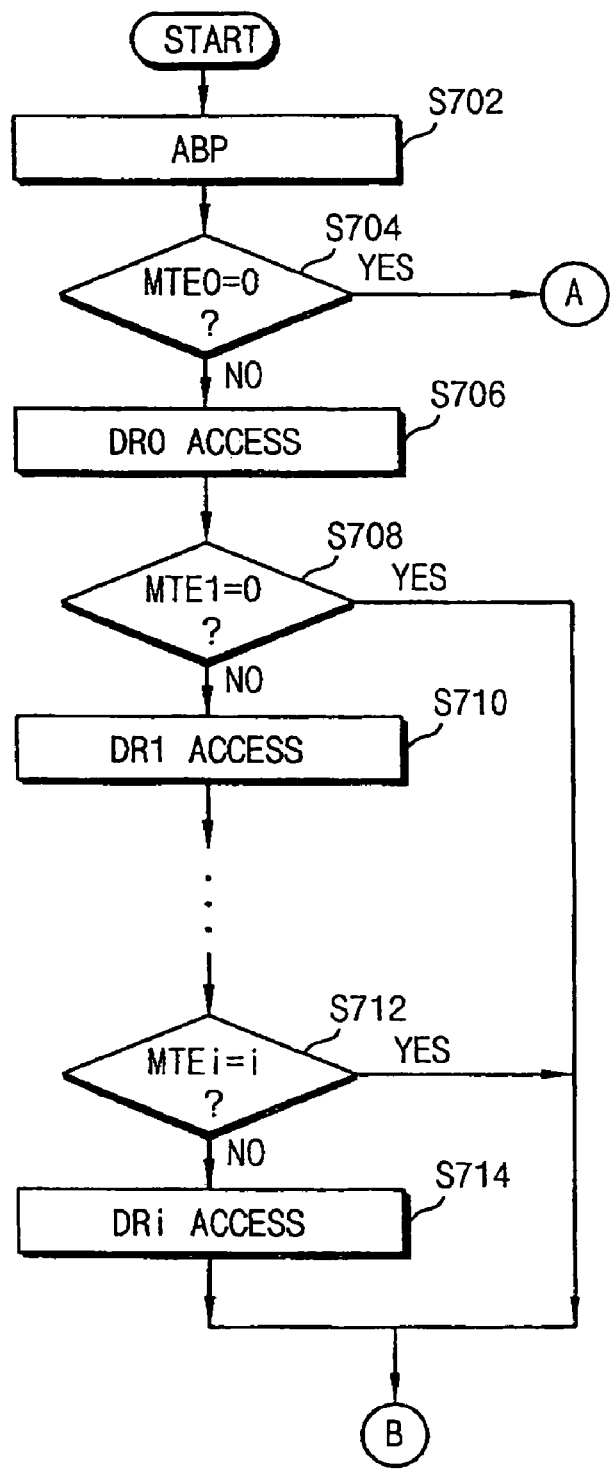

FIGS. 7 and 8 are flow charts illustrating an example operation of a test mode enter sequence of a memory according to an example embodiment of the present invention. Referring to FIG. 7, power may be on and a system processor 210 (e.g, as shown in FIG. 2) may be initialized (e.g., a ROM BIOS initialization) at S602 via a power on self test (POST).

The POST may include, for example, a CPU test, a ROM BIOS check sum test, a DMA controller test, an interrupt controller test, a timer test, a main memory size check, an interrupt vector table initialization, a video test, a memory test, a coprocessor check, a port check, a disk controller check, a keyboard check, a mouse check and/or any other suitable check performed in a self test. Data for the memory test register may be programmed in the CMOS BIOS. During the system booting process the data stored in the CMOS BIOS may be written into a memory test register TMESSR and a TMESDR.

While the data in the CMOS BIOS is written to the memory test register, a value of the MTE0 may be read. If the value of the MTE0 is '0', a memory may not enter a memory test mode. If the value of the MTE0 is '1', data in the data register DR0 may be transferred to the memory chip 220 to set the memory into a test mode.

When the POST process is completed, an operating system may be loaded at S604. The operating system stored, for example, in a hard disk may be loaded to the memory. A value of the flag register 248 may be checked at S606. If the value of the flag register 248 is '0', a normal operation standby mode may be performed at S608. During the normal operating standby mode, one or more test operators may program the memory test registers 244, 246 and 248, for example, when testing of the memory is needed at S610.

The test mode enter sequence data corresponding to the memory to be tested may be provided to the system, the test mode enter sequence may be stored in the TMESSR 244 and the TMESDR 246 included in a PCI configuration (CFG)

register, and the test mode enter sequence data may be programmed. The test mode enter sequence data of the memory test register may be programmed, and the value of the flag register 248 may be set to '1'. At S606, when the value of the flag register 248 is '1', the memory may be set into a test mode at S612.

FIG. 8 is a flowchart illustrating a method for setting a memory into a test mode according to an example embodiment of the present invention. As shown, when a value of the flag register is '1', the controller 242 may provide an ABP command to the memory. In response to the ABP command, all, or substantially all, memory cells in the memory may be precharged at S702.

At S704, the controller 242 may check whether the MTE0 of the TMESSR 244 has a value '0'. If the value of the MTE0 is '0', the data register DR0 of the TMESDR 246 may not be programmed and/or may have failed. Node A (e.g., the current process flow) may pass through S618 of FIG. 7 and node A may be released from the test mode.

Returning to S704, if the value of the MTE0 is '1', the controller 242 may access the data register DR0 of the TMESDR 246 at S706. The test MRS command corresponding to data fetched from the data register DR0 may be applied to the memory. The controller 242 may check (e.g., continuously) whether the MTE1 of the TMESSR 244 has the value '0' at S708.

If the value of the MTE1 is '0', the data register DR1 of the TMESDR 246 may not be programmed and/or may have failed and the current process flow may pass through node B (e.g., as shown in FIG. 7). The operation discussed above with regard to S614 of FIG. 7 may be performed. At S614, a test operation may be performed. At S616, the controller may check whether the test operation has completed. If the test operation has completed, the operation in S616 may be performed.

At S708, if the value of the MTE1 is '1', the controller 242 may access the data register DR1 of the TMESDR 246 at S710. The memory test mode setting process may be performed (e.g., continuously), for example, until the test MRS sequence corresponding to the data fetched from the data register DRi is performed at S714.

In example embodiments of the present invention, each the value of the MTE0 through the MTE9 may be checked (e.g., sequentially) and each test mode enter sequence data of the data register DR0 through DR9 may be accessed. The test MRS command sequence (e.g., as shown in FIG. 6) may be generated and applied to the memory.

When the test MRS command sequence is applied to the memory, for example, for up to 10 successive cycles, the memory may enter into the test mode. If one cycle among the 10 cycles fails, the memory may not enter into the test mode, and a system operator may test the memory by programming the memory test register.

Figure 9:
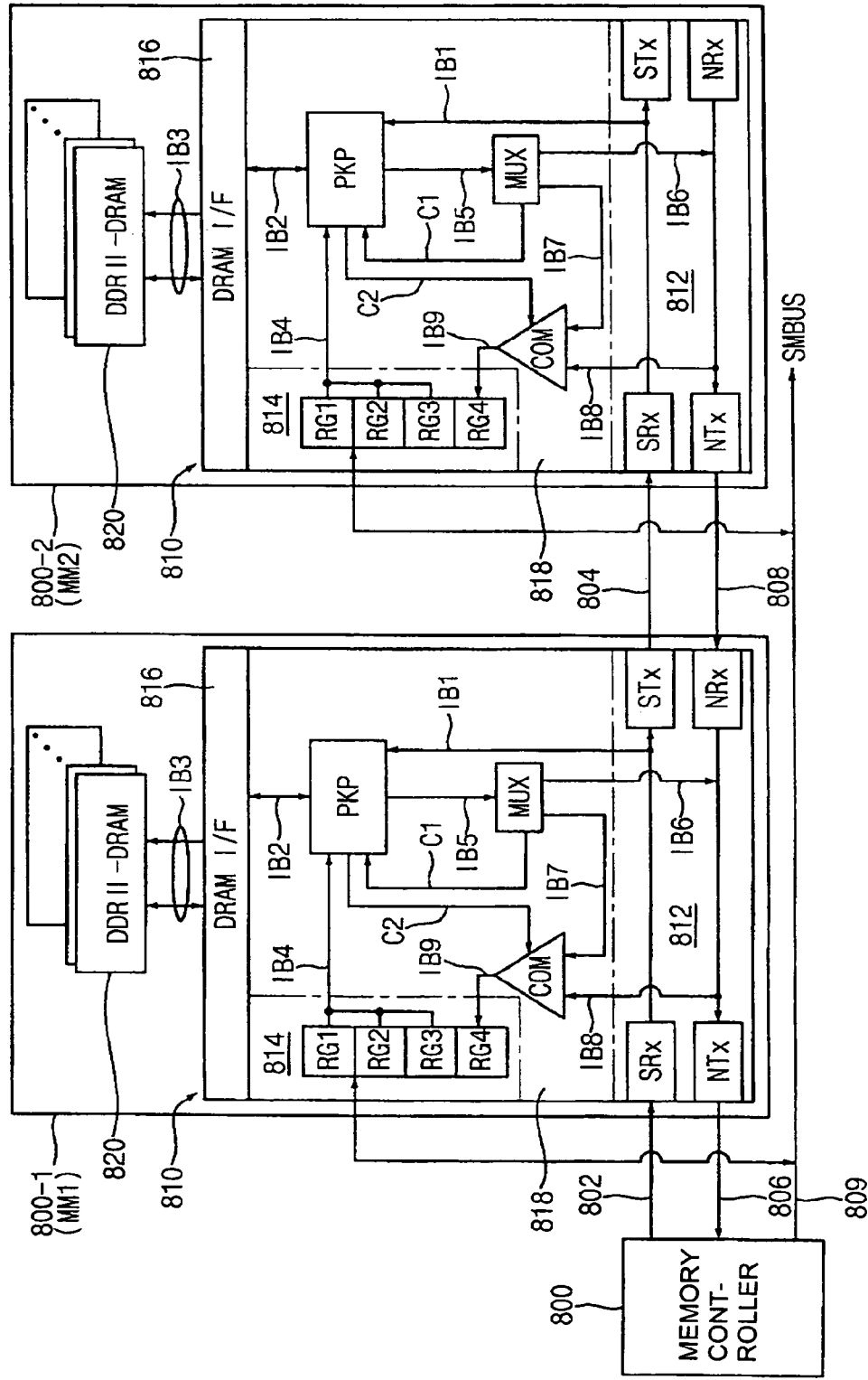
FIG. 9 is a block diagram illustrating a hub of a memory system according to an example embodiment of the present invention.

FIG. 9 is a block diagram illustrating a hub of a memory system according to an example embodiment of the present invention. As shown, the hub of the memory system may include a data transmitting/receiving unit 812, a first interface unit 814, a second interface unit 816 and/or a data processing unit 818. The data transmitting/receiving unit 812 may include a first receiver SRx, a first transmitter STx, a second receiver NRx and/or a second transmitter NTx. The first receiver SRx included in a first module 800-1 may be coupled to a bus 802 and may receive a packet (e.g., a south bound packet (SBP)) from a memory controller 800.

The first receiver SRx may be coupled to the first transmitter STx. The first transmitter STx may be coupled to a first receiver SRx included in an adjacent module 800-2. The first transmitter STx may transmit an SBP received through the SRx of module 800-1.

The bus 802 and/or a bus 804 may transfer the SBP in an identical, or substantially identical, manner. The buses 802 and 804 may be isolated from each other or coupled to each other, for example, in a point-to-point or any other suitable configuration.

The first interface unit 814 may include a flag register RG1, a test mode enter sequence set register (TMESSR) RG2, a test mode enter sequence data register (TMESDR) RG3 and/or a detection register RG4. First interface unit 814 may transmit/receive system management information to/from the memory controller 800, for example, through a system management bus (SMBUS) 809. The first interface unit 814 may store a test mode setting signal provided from the memory controller 800 through the SMBUS 809 (e.g., as shown in FIG. 9), in the flag register RG1, and may store the number of the test mode enter sequences in the TMESSR RG2 and the test mode enter sequence data in the TMESDR RG3.

For example, a test set flag value composed of, for example, 1-bit may be stored in the RG1, a sequence enable data composed of, for example, 24-bits may be stored in the RG2 and 24 test mode enter command data composed of 24-bits may be stored in the RG3.

After programming the registers RG1, RG2 and RG3, the data processing unit 818 may perform the test mode set sequence based on, for example, the method illustrated in, for example, FIGS. 7 and 8, and the memory chips in the memory module may enter into the test mode. Test operators may more easily program the test mode sequences, which may be matched with the test mode sequence corresponding to each of the memory chips in the memory module.

In example embodiments of the present invention, a memory module having a built-in-self-test (BIST) circuit and/or at least one memory mounted on the system may more easily enter into a test mode regardless of a memory manufacturer, memory test time and/or test coverage may be improved.

Example embodiments of the present invention have been described above with reference to the drawings. However, it will be understood that many alternative modifications and/or variations will be apparent to those skilled in the art in light of the foregoing description. Accordingly, example embodiments of the present invention embrace all such alternative modifications and variations as fall within the spirit and scope of the appended claims.

What is claimed is:

1. A method comprising:
    programming test mode enter sequence data into a memory test register, the test mode enter sequence data corresponding to a memory to be tested;
    checking whether a test mode set command has been input;
    accessing the test mode enter sequence data programmed in the memory test register if the test mode set command has been input; and
    setting the memory into the test mode,
    wherein the test mode enter sequence data includes,
        sequence enable data representing a number of the test mode enter sequences, and
        test mode enter command data corresponding to the number of test mode enter sequences.

2. The method of claim 1, wherein the sequence enable data includes a set of valid bits corresponding to the number of the test mode enter sequences.

3. The method of claim 2, wherein each valid bit in the set of valid bits corresponds to one of the test mode enter command data.

4. The method of claim 1, wherein the setting the memory to the test mode includes:
accessing one bit among the sequence enable data;
determining if the accessed bit is a valid bit;
accessing the test mode enter command data corresponding to the sequence enable data if the accessed bit is a valid bit;
providing a test mode setting signal to the memory in response to the accessed test mode enter command data; and
repeating the accessing one bit, the determining, the accessing the test mode enter command data, and the providing a test mode setting signal for another bit among the sequence enable data until the accessed bit is determined to be an invalid bit.

5. The method of claim 1, wherein the test mode enter command data includes test mode register set command data and address data.

6. The method of claim 1, wherein the memory test register includes a peripheral component interconnection (PCI) configuration register.

7. The method of claim 1, wherein the memory test register includes a configuration register in an advanced memory buffer of a fully buffered dual inline memory module (FB-DIMM).

8. A method for setting a memory into a test mode, the method comprising:
reading a setting bit from a test mode enter sequence setting register;
determining if the read setting bit is a valid bit;
accessing corresponding test mode enter sequence data from a test mode enter sequence data register if the read setting bit is determined to be a valid setting bit;
providing a test mode setting signal to a memory chip in response to the accessed enter sequence data; and
repeating the reading, determining, accessing, and providing for each valid setting bit until the read setting bit is determined to be an invalid bit.

9. The method of claim 8, wherein the number of valid setting bits corresponds to the number of test mode enter sequences of the memory chip, and are programmed into the test mode enter sequence setting register.

10. The method of claim 9, wherein the valid setting bits are read based on bit significance of the test mode enter sequence setting register.

11. The method of claim 8, wherein the test mode enter sequence data are sequentially programmed into the test mode enter sequence data register as a data sequence corresponding to the test mode enter sequence of the memory chip.

12. The method of claim 8, wherein the test mode enter sequence data includes mode register set command data of the memory chip and address data.

13. The method of claim 8, further comprising programming test mode register set command data of the memory chip and address data.

14. An apparatus comprising:
a memory test register having test mode enter sequence data programmed therein, the test mode enter sequence data corresponding to a memory to be tested; and
a controller configured to check whether a test mode setting command has been input, to access the test mode enter sequence data programmed into the memory test register if the test mode setting command has been input, and to set the memory to the test mode,
wherein the test mode enter sequence data includes,
sequence enable data representing a number of the test mode enter sequences, and
test mode enter command data corresponding to the number of test mode enter sequences.

15. The apparatus of claim 14, wherein the apparatus is included in a system chip set, and wherein the memory test register includes a peripheral component interconnection configuration register.

16. The apparatus of claim 14, wherein the apparatus is included in a memory buffer chip set of a memory module, and wherein the memory test register includes a configuration register.

17. The apparatus of claim 14, wherein the apparatus is included in a system on chip (SOC), and the memory test register includes a configuration register.

18. The apparatus of claim 14, wherein the sequence enable data includes a set of consecutive valid bits corresponding to the number of the test mode enter sequences.

19. The apparatus of claim 18, wherein each of the consecutive valid bits corresponds to a respective one of the test mode enter command data.

20. The apparatus of claim 18, wherein the test mode enter command data includes test mode register set command data and address data.

21. The apparatus of claim 14, wherein the controller accesses one bit among the sequence enable data If the test mode setting command has been input, determines whether the accessed bit is a valid bit, accesses the test mode enter command data corresponding to the sequence enable data if the accessed bit is a valid bit, provides a test mode setting signal to the memory in response to the accessed test mode enter command data, and repeats the accessing one bit, the determining, the accessing the test mode enter command data, and the providing a test mode setting signal for another bit among the sequence enable data until the accessed bit is an invalid bit.

22. The apparatus of claim 14, the memory test register further including:
a test mode enter sequence setting register storing at least one setting bit; and
a test mode enter sequence data register storing at least one enter sequence data; and wherein
the controller Is configured to read at least one setting bit from the test mode enter sequence setting register, and access the corresponding enter sequence data from the test mode enter sequence data register.

23. The apparatus of claim 22, further including:
an output circuit configured to output a test mode setting signal to at least one memory chip.

24. A system comprising:
at least one memory chip settable into a test mode; and
the apparatus of claim 14.

25. A system comprising:
a plurality of memory chips each settable to a test mode; and
the apparatus of claim 22.

* * * * *